United States Patent
Lin et al.

(10) Patent No.: US 12,047,966 B2
(45) Date of Patent: Jul. 23, 2024

(54) UPLINK INFORMATION GENERATION METHOD AND DEVICE THEREOF

(71) Applicant: GUANGDONG OPPO MOBILE TELECOMMUNICATIONS CORP., LTD., Guangdong (CN)

(72) Inventors: Yanan Lin, Guangdong (CN); Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 252 days.

(21) Appl. No.: 17/515,646

(22) Filed: Nov. 1, 2021

(65) Prior Publication Data
US 2022/0053547 A1 Feb. 17, 2022

Related U.S. Application Data

(63) Continuation of application No. PCT/CN2019/109310, filed on Sep. 30, 2019.

(51) Int. Cl.
H04W 72/23 (2023.01)
H04L 5/00 (2006.01)

(52) U.S. Cl.
CPC ........... *H04W 72/23* (2023.01); *H04L 5/0055* (2013.01)

(58) Field of Classification Search
CPC .... H04W 72/04; H04W 72/23; H04L 1/1854; H04L 1/1822; H04L 1/1861;
(Continued)

(56) References Cited

U.S. PATENT DOCUMENTS

| 2018/0262398 | A1 | 9/2018 | Chen et al. | |
| 2021/0297223 | A1* | 9/2021 | Yang | ............... H04L 1/1896 |
| 2022/0272673 | A1* | 8/2022 | Yang | ............... H04L 1/1864 |

FOREIGN PATENT DOCUMENTS

| CN | 109560896 A | 4/2019 |
| CN | 110034892 A | 7/2019 |

(Continued)

OTHER PUBLICATIONS

Nokia et al: "HARQ scheduling and feedback for NR-U", 3GPP Draft; R1-1904183_HARO, 3rd Generation Partnership Project (3GPP), Mobile Competence Centre; 650, Route Des Lucioles; F-06921 Sophia-Antipolis Cedex; France vol. RAN WG1, No. Xi'an, China; Apr. 8, 2019-Apr. 12, 2019 Apr. 7, 2019, XP051699518 (Year: 2019).*

(Continued)

*Primary Examiner* — Mehmood B. Khan
(74) *Attorney, Agent, or Firm* — Perkins Coie LLP

(57) ABSTRACT

An uplink information generation method and a device thereof. The method includes: receiving at least one piece of first signaling, wherein a physical channel scheduled by the first signaling or a physical channel carrying the first signaling has no group information; determining a first transmission resource transmitting first feedback information corresponding to the first signaling; and a terminal apparatus generating a first feedback information codebook, the first feedback information codebook including the first feedback information and second feedback information, the second feedback information being feedback information corresponding to a target group indicated by second signaling, and a transmission resource of the second feedback information overlapping with the first transmission resource.

18 Claims, 5 Drawing Sheets

(58) Field of Classification Search
CPC ... H04L 5/0094; H04L 5/0055; H04L 1/1685; H04L 5/0053; H04L 5/001; H04L 27/0006
See application file for complete search history.

(56) References Cited

FOREIGN PATENT DOCUMENTS

| | | | |
|---|---|---|---|
| CN | 110149717 A | 8/2019 | |
| CN | 110247747 A | 9/2019 | |
| EP | 4022812 A1 | 7/2022 | |
| WO | 2017045289 A1 | 3/2017 | |
| WO | 2018028401 A1 | 2/2018 | |
| WO | 2018028435 A1 | 2/2018 | |
| WO | 2019072074 A1 | 4/2019 | |
| WO | 2019153250 A1 | 8/2019 | |
| WO | WO-2020060372 A1 * | 3/2020 | ........... H04L 1/1685 |

OTHER PUBLICATIONS

3GPP TSG RAN WG1 Meeting #98—R1-1909496—Prague, Czech Republic, Aug. 26-30, 2019—Huawei, Feature lead summary of HARQ enhancements for NR-U (29 pages).
3GPP TSG RAN WG1 Meeting #98—R1-1909694—Prague, Czech Republic, Aug. 26-30, 2019—Huawei, Feature lead summary#2 of HARQ enhancements for NR-U (29 pages).
3GPP TSG RAN WG1 Meeting #98bis—R1-1910047—Chongqing, China, Oct. 14-20, 2019—Huawei, HiSilicon, HARQ enhancements in NR unlicensed (12 pages).
International Search Report issued Jun. 23, 2020 of PCT/CN2019/109310 (4 pages).
Extended European Search Report of the European application No. 19947587.2, issued on May 6, 2022. 11 pages.
First Examination Report of the Indian application No. 202117054102, issued on May 9, 2022. 7 pages with English Translation.
First Office Action of the Chinese application No. 202110609976.9, issued on Jul. 1, 2022. 9 pages with English Translation.
Intel Corporation "Enhancements to HARQ for NR-unlicensed" 3GPP TSG RAN WG1 Meeting #97 R1-1906787; Reno, Nevada, USA, May 13-17, 2019. 13 pages.
Nokia et al. "HARQ scheduling and feedback for NR-U" 3GPP TSG RAN WG1 Ad-Hoc Meeting #96bis R1-1904183; Xi'an, China, Apr. 8-12, 2019. 12 pages.
Examination Report for European Application No. 19947587.2 issued Feb. 7, 2023. 14 pages.
Examiner's Report for Canadian Application No. 3139823 issued Feb. 27, 2023. 4 pages.
Second Office Action of the European application No. 19947587.2, issued on Jul. 19, 2023. 5 pages.
First Office Action of the Japanese application No. 2021-577844, issued on Aug. 4, 2023. 9 pages with English translation.
Qualcomm Incorporated Enhancements to Scheduling and HARQ operation for NR-U 3GPP TSG RAN WG1 Meeting #98 R1-1909247 Aug. 26-30, 2019 21pages.
Examiners call for European Application No. 19947587.2 Issued Nov. 29, 2023, 5 Pages.
Second Office Action of the Canadian Application No. 3139823, issued on Jan. 29, 2024. 4 pages.
Hearing Notice of the Indian Application No. 202117054102, issued on Jun. 7, 2024. 2 pages.

\* cited by examiner

333
UPLINK INFORMATION GENERATION METHOD AND DEVICE THEREOF

CROSS-REFERENCE TO RELATED APPLICATION

The present application is a continuation application of International PCT Application No. PCT/CN2019/109310, filed on Sep. 30, 2019, the entire content of which is hereby incorporated by reference.

TECHNICAL FIELD

The present disclosure relates to the technical field of communication, in particular to the technical field of uplink information transmission.

RELATED ART

An unlicensed spectrum is a spectrum classified by countries and regions that is available to communication of radio devices. The spectrum is generally regarded as a shared spectrum, that is, communication devices in different communication systems may use the spectrum as long as they meet the regulatory requirements configured by countries or regions on the spectrum, without applying for exclusive spectrum authority to the government. With the development of wireless communication technology, a Long Term Evolution (LTE) system and a New Radio (NR) system will consider network planning on the unlicensed spectrum to perform data service transmission by using the unlicensed spectrum.

In the 16th release of an NR-based Access to Unlicensed Spectrum (NR-U) system, a group-based ACK/NACK feedback mode is supported. However, whether to support the feedback mode is a capability of a terminal, and not all UEs are restricted to use that feedback mode. A base station indicates group information to which Physical Downlink Shared Channel (PDSCH) scheduled by Downlink control information (DCI) belongs or group information to which Physical Downlink Control Channel (PDCCH) carrying DCI belongs by scheduling DCI. PDCCH may support multiple DCI formats, DCI formats 0_0 and 0_1 are used for scheduling physical uplink shared channel PUSCH, and DCI formats 1_0 and 1_1 are used for scheduling physical downlink shared channel PDSCH.

In DCI format 1_0, the size of bits in each information field is constant except the frequency domain resource information field, while the bit lengths of most information fields in DCI format 1_1 are configured depending on the higher layer signaling sent by the base station. Therefore, the number of bits in DCI format 1_0 is small, which basically will not cause a misunderstanding for it by the terminal device and a network device, and its transmission reliability is high. Therefore, in some specific situations, the base station must use DCI format 1_0 to maintain the basic connection of downlink data. For example, an initial connection process between a terminal device and a network device, a reconnection process between a terminal and a base station, and a reconfiguration process of high-level signaling all need DCI format 1_0 to maintain the basic transmission.

However, when the terminal device is configured to use the group-based ACK/NACK feedback mode, because the size of bits of DCI format 1_0 needs to be kept constant, the information field cannot be added at will. Moreover, the group-based ACK/NACK feedback mode is not an essential function in NR-U system. It is not suitable to directly introduce the information (group information, new feedback information field NFI, etc.) needed by the group-based ACK/NACK feedback mode into DCI format 1_0.

Therefore, when the terminal device adopts the group-based ACK/NACK feedback mode, if DCI format 1_0 is received, because DCI format 1_0 lacks necessary information, uplink feedback information cannot be generated according to the normal group-based ACK/NACK feedback mode, which leads to problems such as low uplink transmission efficiency and large service delay, resulting in scheduling limitation and system efficiency loss.

SUMMARY

The present disclosure provides a method for generating uplink information and a device.

The disclosure provides the following technical scheme.

A method for generating uplink information is provided, including: receiving, by a terminal device, at least one first signaling, wherein a physical channel scheduled by the first signaling or a physical channel carrying the first signaling has no group information; determining, by the terminal device, a first transmission resource for transmitting first feedback information corresponding to the first signaling; generating, by the terminal, a first feedback information codebook, wherein the first feedback information codebook includes the first feedback information and second feedback information, the second feedback information is feedback information corresponding to a target group indicated by a second signaling, and a transmission resource of the second feedback information is overlapped with the first transmission resource.

A device for generating uplink control information is provided, including: a receiving unit, configured to receive at least one first signaling, wherein a physical channel scheduled by the first signaling or a physical channel carrying the first signaling has no group information; a determining unit, configured to determine a first transmission resource for transmitting first feedback information corresponding to the first signaling; and a transmission unit, configured to generate a first feedback information codebook, wherein the first feedback information codebook includes the first feedback information and second feedback information, the second feedback information is feedback information corresponding to a target group indicated by a second signaling, and a transmission resource of the second feedback information is overlapped with the first transmission resource.

A method for generating uplink information is provided, including: sending, by a network device, at least one first signaling and at least one second signaling to a terminal device, wherein a physical channel scheduled by the first signaling or a physical channel carrying the first signaling has no group information; receiving, by the network device, a first feedback information codebook sent by the terminal device; wherein the first feedback information codebook is generated by the terminal device according to first feedback information and second feedback information, the first feedback information is feedback information corresponding to the first signaling, the second feedback information is feedback information corresponding to a target group indicated by the second signaling, and a transmission resource of the second feedback information is overlapped with a transmission resource of the first feedback information.

An uplink information generating device is provided, including: a sending unit, configured to send at least one first signaling and at least one second signaling to a terminal device, wherein a physical channel scheduled by the first signaling or a physical channel carrying the first signaling has no group information; a codebook receiving unit, configured to receive a first feedback information codebook sent by the terminal device; wherein the first feedback information codebook is generated by the terminal device according to first feedback information and second feedback information, the first feedback information is feedback information corresponding to the first signaling, the second feedback information is feedback information corresponding to a target group indicated by the second signaling, and a transmission resource of the second feedback information is overlapped with a transmission resource of the first feedback information.

An uplink information generating device is provided, including: a processor, a memory and a network interface; wherein the processor calls a program in the memory, executes an implementation of any one of the methods for generating uplink information, and sends an execution result out through the network interface.

A computer-readable storage medium is provided, wherein a program for a method for generating uplink information is stored on the computer-readable storage medium, when the program for the method for generating uplink information is executed by a processor, an implementation of executing any one of the methods for generating uplink information is realized.

DETAILED DESCRIPTION

In order to make the object, technical scheme and advantage of the present disclosure clearer, the present disclosure will be further described in detail with reference to the drawings and specific implementations. It should be understood that implementations described herein are only for the purpose of explaining the present disclosure and are not intended to limit the present disclosure. However, the present disclosure may be embodied in many different forms and is not limited to the specific implementations described herein. On the contrary, the purpose of providing these specific implementations is to make the understanding of the disclosure of the present utility mode more thorough and comprehensive.

Unless otherwise defined, all technical and scientific terms used herein have the same meanings as those commonly understood by those skilled in the technical field of the present disclosure. Terms used in the description of the present disclosure herein are for the purpose of describing specific implementations only, but are not intended to limit the present disclosure. As used herein, the term "and/or" includes any and all combinations of one or more related listed items.

The following is a corresponding table for an abbreviation and a full name of a key term appearing in the present disclosure:

| abbreviation | English full name |
|---|---|
| LTE | Long Term Evolution |
| NR | New Radio |
| NR-U | NR-based Access to Unlicensed Spectrum |
| UE | User Equipment |
| PDCCH | Physical Downlink Control Channel |
| PDSCH | Physical Downlink Shared Channel |
| PUCCH | Physical Uplink Control Channel |
| PUSCH | Physical Uplink Shared Channel |
| HARQ | Hybrid Automatic Repeat reQuest |
| ACK/NACK | Acknowledgement/Negative Acknowledgement |
| DCI | Downlink control information |
| DAI | Downlink assignment index |
| C-DAI | Counter-DAI |
| T-DAI | Total-DAI |
| BWP | Bandwidth part |
| NFI | New Feedback Information |

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet wireless Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, or a 5G system.

Figure 1:
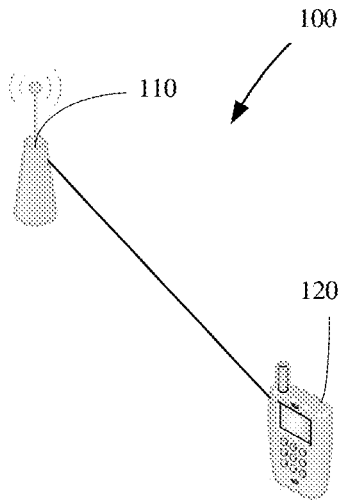
FIG. 1 is a system architecture diagram applied in an implementation of the present disclosure.

Please refer to FIG. 1, which shows a wireless communication system 100 in which an implementation of the present disclosure is applied. The wireless communication system includes a network device 110 and at least one terminal device 120 located in a coverage area of the network device 110. The network device 110 sends trigger signaling or DCI to the terminal device 120, and the terminal device 120 sends ACK/NACK feedback information to the network device according to the trigger signaling or DCI.

Optionally, the wireless communication system 100 may include multiple network devices and a coverage area of each network device may include other quantity of terminal devices, which is not limited in the implementations of the present disclosure.

The network device 110 may provide communication coverage for a specific geographical area, and may communicate with a terminal device (e.g., UE) within the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system or an NR system, or a radio controller in a Cloud Radio Access Network (CRAN). Or the network device may be a relay station, an access point, a vehicle-mounted device, or a wearable device, a network side device in a 5G network, or a network device in a future evolved Public Land Mobile Network (PLMN), etc.

The terminal device 120 may be mobile or fixed. Optionally, the terminal device 120 may be referred to as an access terminal, User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

According to the technical scheme provided in the present disclosure, in the NR-U system, when a group-based acknowledgement feedback mode (ACK/NACK feedback mode) is used, on the premise of not adding the information field in DCI format 1_0, the uplink data can be multiplexed and transmitted together with other information with grouping.

DCI format 1_0 (referred to as DCI format one in the present disclosure) is specifically shown in Table 1 below.

TABLE 1

| DCI format 1_0 | |
| --- | --- |
| Identifier for DCI formats | 1 bit |
| Frequency domain resource assignment | bits |
| Time domain resource assignment | 4 bits |
| VRB-to-PRB mapping | 1 bit |
| Modulation and coding scheme | 5 bits |
| New data indicator | 1 bit |
| Redundancy version | 2 bits |
| HARQ process number | 4 bits |
| Downlink assignment index | 2 bits |
| TPC command for scheduled PUCCH | 2 bits |
| PUCCH resource indicator | 3 bits |
| PDSCH-to-HARQ_feedback timing indicator | 3 bits |

DCI format 1_1 (referred to as DCI format two in the present disclosure) is shown in Table 2 below.

TABLE 2

| DCI format 1_1 | | |
| --- | --- | --- |
| Identifier for DCI formats | | 1 bit |
| Carrier indicator | | 0 or 3 bits |
| Bandwidth part indicator | | 0, 1 or 2 bits |
| Frequency domain resource assignment | | $N_{RBG}$ bits if only resource allocation type 0 is configured, where $N_{RBG}$ is defined in Subclause 5.1.2.2.1 of [6, TS38.214], $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil, N_{RBG}) + 1$ bits if both resource allocation type 0 and 1 are configured. |
| Time domain resource assignment | | 0, 1, 2, 3, or 4 bits |
| PRB bundling size indicator | | 0 or 1 bit |
| Rate matching indicator | | 0, 1, or 2 bits |
| ZP CSI-RS trigger | | 0, 1, or 2 bits |
| transport block 1 | Modulation and coding scheme | 5 bits |
| | New data indicator | 1 bit |
| | Redundancy version | 2 bits |
| transport block 2 | Modulation and coding scheme | 5 bits |
| | New data indicator | 1 bit |
| | Redundancy version | 2 bits |
| HARQ process number | | 4 bits |
| Downlink assignment index | | 0, 2 or 4 bits |
| TPC command for scheduled PUCCH | | 2 bits |
| PUCCH resource indicator | | 3 bits |
| PDSCH-to-HARQ_feedback timing indicator | | 0, 1, 2, or 3 bits |

TABLE 2-continued

DCI format 1_1

| | |
|---|---|
| Antenna port(s) | 4, 5, or 6 bits |
| Transmission configuration indication | 0 or 3 bits |
| SRS request | 2 or 3 bits |
| CBG transmission information (CBGTI) | 0, 2, 4, 6, or 8 bits |
| CBG flushing out information (CBGFI) | 0 or 1 bit |
| DMRS sequence initialization | 1 bit |

The following implementations of the present disclosure will explain in detail how the terminal device generates feedback information corresponding to DCI format 1_0 in the group-based feedback mode and uploads the feedback information to the network device.

First Implementation

Figure 2:
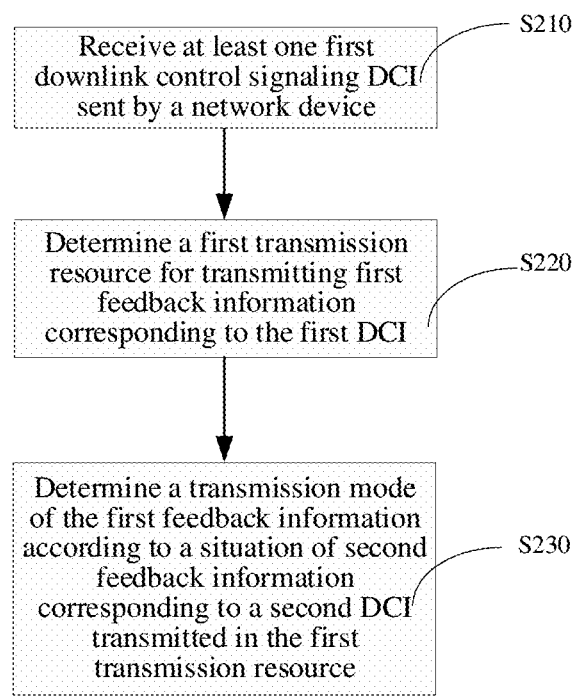
FIG. 2 is a flow chart of a method for generating uplink information provided in the first implementation of the present disclosure.

Please refer to FIG. 2, a method for generating uplink information is provided in the first implementation of the present disclosure, and the method includes S210, S220, and S230.

In S210, a terminal device receives at least one first signaling, wherein a physical channel scheduled by the first signaling I or a physical channel carrying the first signaling has no group information; "having no group information" includes a case that group information is not indicated in DCI, or a case that there is no predetermined rule for determining group information.

Optionally, the first signaling is a first downlink control signaling DCI. Specifically, the first DCI is a DCI adopting DCI format one (as described above, DCI format one is DCI format 1_0), and there is no group information and New feedback Indicator (NFI) information fields in DCI format one.

Figure 3:
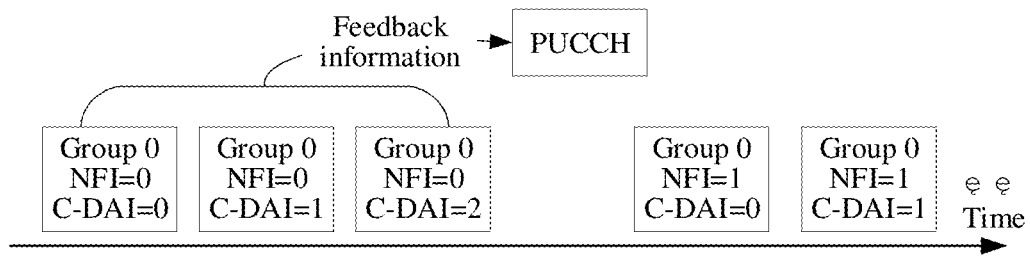
FIG. 3 is a schematic diagram of NFI information field indicating that corresponding group is turned over.

Referring to FIG. 3, the NFI information field is used for indicating that feedback information in a group corresponding to PDSCH scheduled by the DCI or PDCCH carrying the DCI is cleared. Second feedback information (ACK/NACK message) corresponding to three second DCIs with NFI=0 in feedback group 0 (Group 0) is successfully fed back through PUCCH. NFI=0 is a target value of NFI, wherein the target value is a value of a new feedback indicator field corresponding to the target group when the terminal device determines to transmit the second feedback information corresponding to the target group according to the second signaling, and the value in this implementation is 0. If the value of NFI is a first value when a network device (e.g., a base station) schedules the feedback group 0 subsequently, the feedback group 0 does not release corresponding feedback information, that is, it is a non-turnover working mode. The first value, which is the value of NFI, is the target value, or is the same as a predetermined value.

If the value of NFI is a second value when the network device schedules the feedback group 0 subsequently, the feedback group 0 restarts to organize, and releases the feedback information previously corresponding to the NFI=0, that is, a turnover working mode. The second value is different from the target value (in this implementation, NFI is configured to 1) or is the same as the predetermined value.

In S220, the terminal device determines a first transmission resource for transmitting first feedback information corresponding to the first signaling.

Optionally, the first feedback information is ACK/NACK information, and ACK/NACK information is also called an ACK Codebook in NR-U. Optionally, the feedback information corresponding to a first DCI in DCI format one (as described above, DCI format one is DCI format 1_0) is the first feedback information.

In S230, the terminal device determines a transmission mode of the first feedback information according to a situation of second feedback information corresponding to a second signaling transmitted in the first transmission resource; wherein the physical channel scheduled by the second signaling or the physical channel carrying the first signaling contains group information.

Optionally, the second signaling is a second downlink control signaling DCI. Specifically, the second DCI is DCI in DCI format two (i.e., DCI format 1_0), wherein DCI format two includes group information and NFI (New feedback Indicator) information fields.

Specifically, the second feedback information is feedback information generated by a group-based feedback mode, and may be feedback information corresponding to the second DCI, wherein the second DCI is CDI information in DCI format two.

Optionally, the second DCI is DCI in DCI format two (as described above, DCI format one is DCI format 1_0), and contains group information.

Specifically, the second feedback information is feedback information generated by a group-based feedback mode (i.e., a group-based ACK/NACK feedback mode).

Optionally, the first transmission resource is one of the following: slot, time domain symbol, and PUCCH.

An NR system supports determining HARQ feedback timing dynamically. The terminal device may determine a preconfigured feedback timing set in advance. The preconfigured feedback timing set includes at most 8 timing values. For DCI format 1, the preconfigured feedback timing set is determined by a protocol. For DCI format 2, the preconfigured feedback timing set is configured by the base station. The base station indicates that a value in the preconfigured feedback timing set is k through a PDSCH-to-HARQ_feedback timing indicator information field in the DCI. An end position of PDSCH scheduled by DCI is at slot n, then corresponding ACK/NACK feedback information is transmitted in slot n+k.

Figure 4:
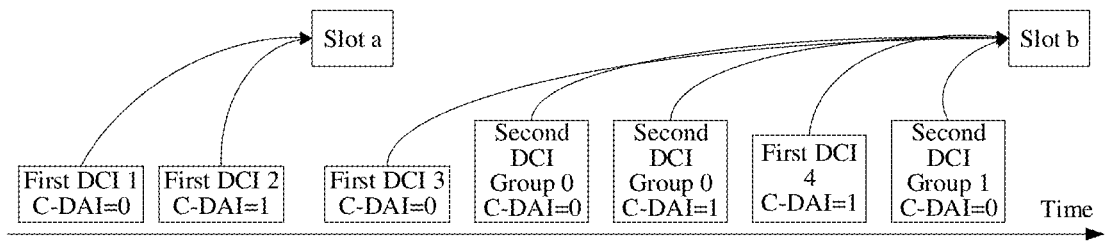
FIG. 4 is a schematic diagram of transmission of feedback information indicated by DCI in resources.

Please refer to FIG. 4, a first DCI 1 and a first DCI 2 transmit feedback information (ACK/NACK information) through a same slot a, and DAIs of the first DCI 1 and the first DCI 2 are counted cumulatively. A first DCI 3 and a first DCI 4 correspond to slot b, and DAIs of the first DCI 3 and the first DCI 4 are counted cumulatively. And a second DCI similarly corresponding to slot b does not participate in the DAI counting in the first DCI. It can be seen from FIG. 3 that the second DCI (that is, DCI in DCI format two) has the displayed group information: group 0 and group 1.

A DAI information field included in the first DCI is used for indicating the number of the first DCIs received up to the current first DCI. The feedback information corresponding to the first DCIs is transmitted on the first resource.

Figure 5:
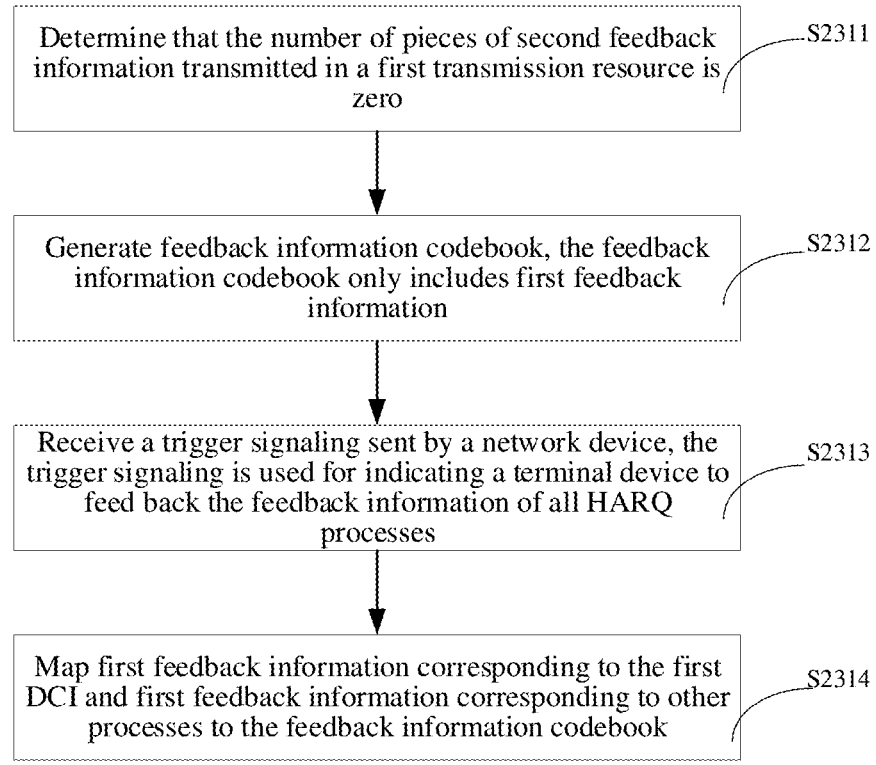
FIG. 5 is a further detailed flowchart of S230 in FIG. 2.

Referring to FIG. 5, optionally, S230 may include S2311 and S2312.

In S2311, it is determined that the number of pieces of second feedback information transmitted in the first transmission resource is zero.

In S2312, a feedback information codebook is generated, wherein the feedback information codebook only includes the first feedback information. Optionally, the first feedback information is ordered and cascaded according to DAI. Thereafter, the first feedback information is transmitted in the first resource.

Optionally, the first feedback information is ordered and cascaded in a DAI ascending order, or ordered and cascaded in a DAI descending order.

For example, taking a case of slot a in FIG. 3 as an example, the transmitted feedback information is {bDAI0, bDAI1}, wherein bDAIi is ACK/NACK information of a downlink channel corresponding to the first DCI DAI=b.

Please continue to refer to FIG. 5. Optionally, S230 further includes S2313 and S2314.

In S2313, a trigger signaling sent by the network device is received, wherein the trigger signaling is used for indicating the terminal device to feed back the feedback information of all HARQ processes.

In S2314, first feedback information corresponding to the first DCI and first feedback information corresponding to other processes are all mapped to the feedback information codebook. That is, the first feedback information corresponding to the HARQ process carried in the PDSCH scheduled by the first DCI is multiplexed and transmitted with the first feedback information corresponding to other processes.

Figure 6:
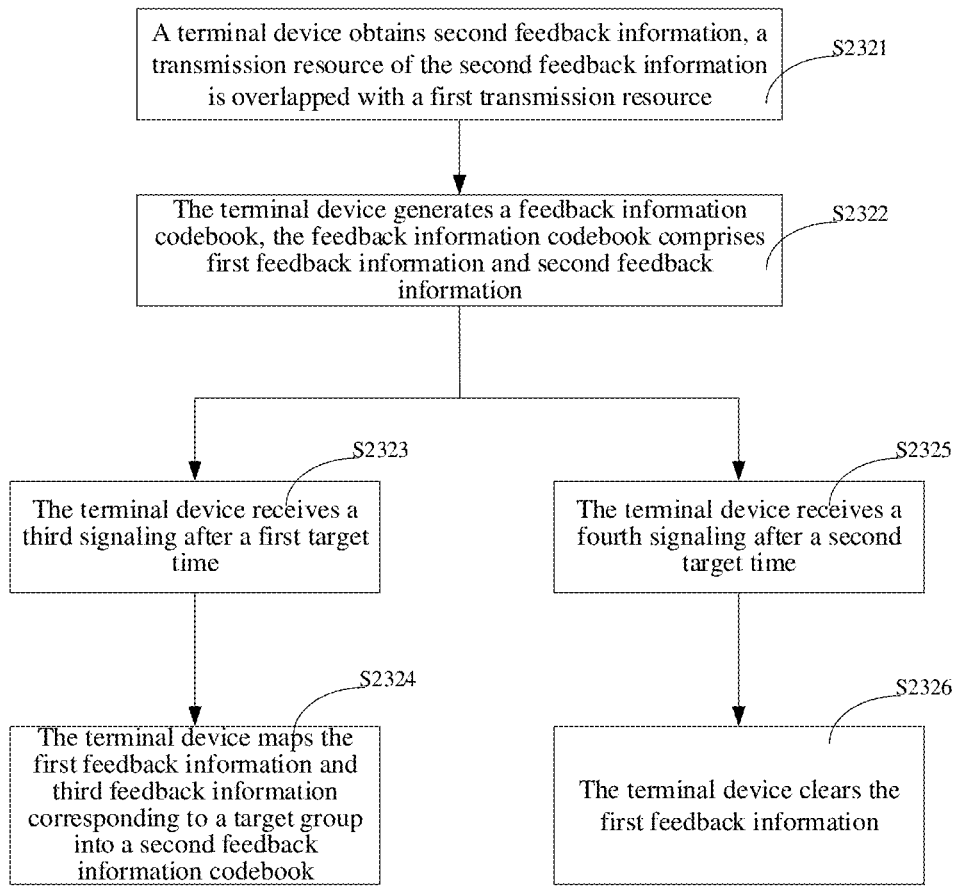
FIG. 6 is another detailed flowchart of S230 in FIG. 2.

Referring to FIG. 6, optionally, S230 may include S2321 and S2322.

In S2321, the terminal device obtains second feedback information, wherein a transmission resource of the second feedback information is overlapped with the first transmission resource. Optionally, the second feedback information is feedback information corresponding to a target group indicated by a second DCI. Optionally, the transmission resource of the second feedback information is overlapped with the first transmission resource, including the case of completely overlapped or partially overlapped.

In S2322, the terminal device generates a first feedback information codebook, wherein the feedback information codebook includes the first feedback information and the second feedback information.

Further, the terminal device sends the first feedback information codebook to the network device in the first transmission resource.

A physical channel scheduled by the second DCI or a physical channel carrying the second DCI contains group information.

It should be noted that NR supports two HARQ feedback information generating modes, which may also be called HARQ-ACK codebook generating modes, i.e., semi-static feedback information generating mode and dynamic feedback information generating mode. When the terminal device adopts the semi-static feedback information generating mode, the number of bits of feedback information (ACK/NACK information) carried in a PUCCH is determined semi-statically, which has nothing to do with the actual scheduling situation. When the terminal device adopts the dynamic feedback information generating mode, the terminal device determines the number of bits of feedback information according to the scheduling situation of the base station, which can significantly reduce the feedback overhead. At this time, the terminal device needs to determine the actual scheduling quantity according to DAI in DCI.

That is to say, when the terminal device adopts the semi-static feedback information generating mode, DAI information in DCI does not need to be used, and the DAI information in DCI needs to be used only when the dynamic feedback information generating mode is adopted. However, the C-DAI information field in DCI format 1_0 always exists. Even when the terminal device adopts the static feedback information generating mode, the C-DAI information field still exists in DCI. While in DCI format 1_1, the DAI information field exists when the dynamic HARQ-ACK codebook generating mode is adopted, otherwise the DAI information field does not exist. DCI format 1_0 only contains the C-DAI information field, but does not contain a T-DAI information field. DCI format 1_1 contains C-DAI, or contains C-DAI and T-DAI, or does not contain the DAI information field.

In order to ensure that the network device and the terminal device have a consistent understanding of the number of bits of feedback information corresponding to a group, it is necessary to count the C-DAI and the T-DAI of the physical downlink channel in each group independently.

Please continue to see FIG. 6. Optionally, S230 may further include S2323 and S2324.

In S2323, if the terminal device receives a third signaling after a first target time, the third signaling indicates the terminal device to transmit the feedback information of the target group by using the second transmission resource, wherein new feedback indication information corresponding to the target group is a first value.

In S2324, the terminal device maps the first feedback information and third feedback information corresponding to the target group into a second feedback information codebook. Optionally, the third feedback information includes the second feedback information.

When the target group is transmitted again, the feedback information in the target group is increased compared with the previous transmission, so the feedback information in the target group is the third feedback information in this feedback.

Further, the terminal device sends the second feedback information codebook to the network device through the second transmission resource.

Optionally, the first target time is: a sending start time of the second signaling; or, a start time of the first transmission resource; or, a sending end time of the second signaling; or, an end time of the first transmission resource.

So-called "after a time" includes: a start time of the third signaling is after a start time of the first transmission resource or the second signaling; or, a start time of the third signaling is after an end time of the first transmission resource or the second signaling.

Optionally, that new feedback indication information corresponding to the target group is a first value, includes: the first value is the same as a target value, and the target value is a value of the new feedback indicator field corresponding to the target group when the terminal device determines to transmit the second feedback information corresponding to the target group according to the second signaling; or, the first value is a predetermined value.

Please continue to see FIG. 6. Optionally, S230 may further include S2325 and S2326.

In S2325, the terminal device receives a fourth signaling after a second target time, wherein the fourth signaling indicates the terminal device to transmit information of the target group, and the new feedback indication information corresponding to the target group is a second value.

In S2326, the terminal device clears the first feedback information.

Optionally, the second target time is the end time of the first transmission resource or the start time of the first transmission resource.

Optionally, that the new feedback indication information corresponding to the target group is the second value, includes: the second value is different from the target value, and the target value is the value of the new feedback indicator field corresponding to the target group when the terminal device determines to transmit the second feedback information corresponding to the target group according to the second signaling; or, the second value is a predetermined value.

Optionally, in this implementation of the present disclosure, the terminal device generates the first feedback information codebook or the second feedback information codebook according to one of the following arrangement modes, that is, the first feedback information and the second feedback information are arranged into the first feedback information codebook or the second feedback information codebook in the following orders, in other words, the first feedback information and the second feedback information in the first feedback information codebook or the second feedback information codebook are arranged in the following orders.

Order 1: the first feedback information corresponding to the first DCI is at front, and the first feedback information is arranged in an order of the downlink channel index DAI indicated in the at least one first signaling. The second feedback information corresponding to the second DCI or the third feedback information is at back, and is arranged in an order of the group information of the target group, and is also arranged in an order of DAI within each group.

Taking the case of slot b in FIG. 4 as an example, an arrangement order of transmitted feedback information is {bDAI0, bDAI1, bgroup0, DAI0, bgroup0, DAI1, bgroup1, DAI0}, wherein bDAIi is ACK/NACK information of a downlink channel corresponding to the first DCI DAI=b, and bgroupp, DAI=q is ACK/NACK information of a downlink channel corresponding to DAI=q in the second DCI indication group p.

Order 2: the first feedback information corresponding to the first DCI is at the end, and the first feedback information is arranged in an order of the downlink channel index indicated in the at least one first signaling. The second feedback information or the third feedback information is arranged at front and arranged in an order of the group information of the target group in the second feedback information. Within each target group, the second feedback information or the third feedback information is arranged in an order of the downlink channel index of the second signaling. Taking the slot b in FIG. 4 as an example, transmitted ACK/NACK information is {bgroup0, DAI0, bgroup0, DAI1, bgroup1, DAI0, bDAI0, bDAI1,}, and the parameter information is the same as above.

It can be understood that after receiving the first codebook feedback information or the second codebook feedback information, the network device also reads the first codebook feedback information or the second codebook feedback information in the above arrangement order.

It can be understood that those skilled in the art can also configure the arrangement order of other feedback information according to the concept of the present disclosure and the above implementations, and these are all within the scope of the present disclosure, and will not be enumerated and described in detail.

Figure 7:
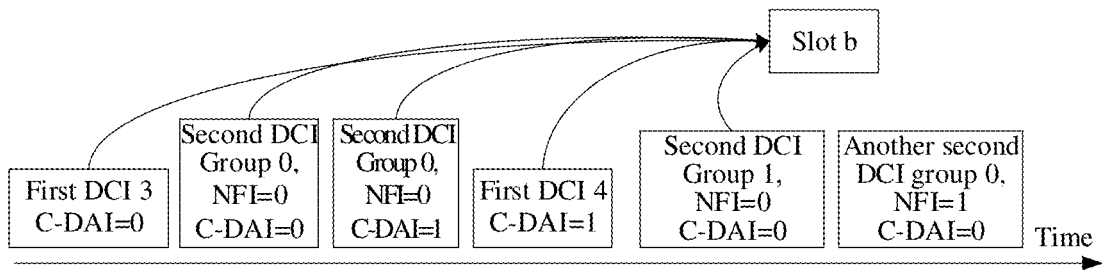
FIG. 7 is a schematic diagram of another second DCI indicating that feedback information corresponding to a target group in a first transmission resource is turned over.

Specifically, please refer to FIG. 7, it is an implementation in which the fourth signaling is received.

Another second DCI (i.e., fourth signaling) sent by the network device is received, wherein the other second DCI indicates to process the second feedback information corresponding to the target group.

Then the terminal device arranges the first feedback information and the second feedback information into the feedback information codebook according to an indication of the other second DCI. That is, the first feedback information transmitted in the first resource is processed in the same way according to the indication of the other second DCI.

Optionally, the other second DCI indicates the target group (group 0) and indicates that NFI information is turned over (in this implementation, the value of NH is changed from 0 to 1). That is, if the second DCI indicates to clear the second feedback information corresponding to group 0, the first feedback information transmitted similarly in the first resource is also cleared.

Figure 8:
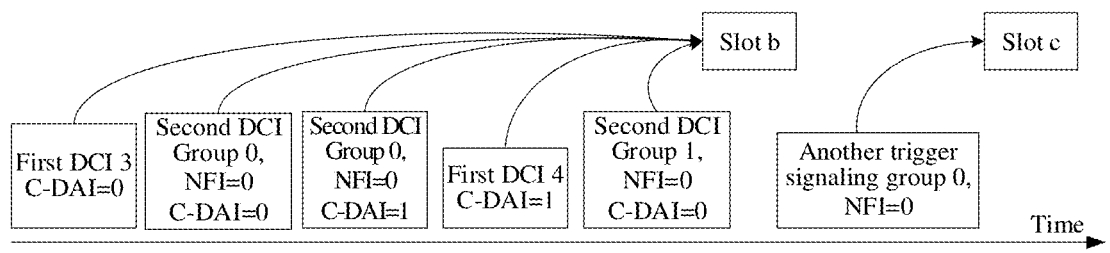
FIG. 8 is a schematic diagram of another trigger signaling indicating that the feedback information corresponding to a target group in a first transmission resource is turned over to a second transmission resource for transmission.

Specifically, please refer to FIG. 8, it is an implementation in which the third signaling is received.

Another trigger signaling (i.e., third signaling) sent by the network device is received, wherein the other trigger signaling indicates to process the second feedback information corresponding to the target group.

Then the terminal device arranges the first feedback information and the second feedback information into the feedback information codebook according to the indication of the other trigger signaling. That is, the first feedback information transmitted in the first resource is processed in the same way according to the indication of the other trigger signaling.

Optionally, the other trigger signaling indicates to use the second transmission resource (slot c in this implementation) to transmit the second feedback information corresponding to the indicated target group (group 0 in this implementation), and indicates that the NFI information is not turned over (i.e., the second feedback information corresponding to group 0 does not need to be cleared). Then, the terminal device arranges both the first feedback information and the second feedback information into the feedback information codebook, so that both the first feedback information and the second feedback information are transmitted on the second resource. That is, the terminal device also retransmits the first feedback information, which is transmitted in the first resource, through the second resource at the same time.

Optionally, the second transmission resource is one of the following resources: a slot, a time domain symbol, and a PUCCH.

For example, the terminal device receives a new trigger signaling, indicating to transmit the second feedback information corresponding to a feedback group 0 (NFI=0) on the second transmission resource slot c. Since the second feedback information corresponding to feedback group 0 (NFI=0) is multiplexed and transmitted with the first feedback information corresponding to the first DCI 3 and the first DCI 4 in the first transmission resource slot b, the first feedback information corresponding to the first DCI 3 and the first DCI 4 is multiplexed and retransmitted with second information of feedback group 0 (NFI=0) at the same time in slot c.

Optionally, in order to ensure that the terminal device and the network device have a consistent understanding of the downlink channel included in each group, the trigger signaling may simultaneously indicate NFI information and/or T-DAI information corresponding to the triggered feedback group.

In the first implementation of the present disclosure, when a terminal device configured to use a group-based feedback mode receives DCI information of DCI format one, and a transmission resource of the first feedback information corresponding to DCI format one is overlapped with a transmission resource of other second feedback information with grouping, the first feedback information corresponding to DCI format one is multiplexed and transmitted with other second feedback information with grouping. Therefore, other information (such as group information and NFI information) does not need to be introduced into DCI format one, which ensures that the terminal device and the network device can keep a consistent understanding of feedback information and avoids receiving errors caused by ambiguity. At the same time, it may ensure that the terminal device and network device maintain normal data transmission functions during processes such as initial connection, reconnection and RRC signaling reconfiguration.

Second Implementation

Figure 9:
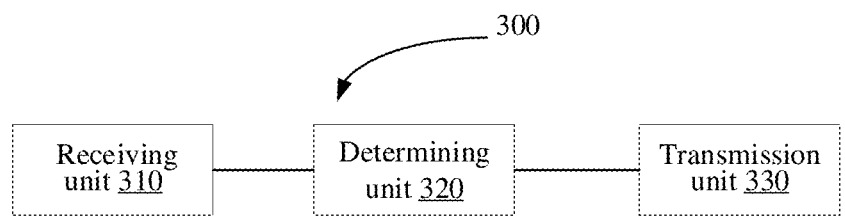
FIG. 9 is a schematic block diagram of a device for generating uplink information provided in the second implementation of the present disclosure.

Referring to FIG. 9, a device 300 for generating uplink information is provided in the second implementation of the present disclosure, including: a receiving unit 310, a determining unit 320, and a transmission unit.

The receiving unit 310 is configured to receive at least one first signaling sent by a network device, wherein a physical channel scheduled by the first signaling or a physical channel carrying the first signaling has no group information.

The determining unit 320 is configured to determine a first transmission resource for transmitting first feedback information corresponding to the first signaling.

The transmission unit 330 is configured to generate a first feedback information codebook, wherein the first feedback information codebook includes the first feedback information and second feedback information, wherein the second feedback information is feedback information corresponding to a target group indicated by the second signaling, and a transmission resource of the second feedback information is overlapped with the first transmission resource.

Optionally, the second DCI includes group information indicating a downlink channel corresponding to the DCI. Optionally, the second DCI includes NFI information and group information indicating the downlink channel corresponding to the DCI.

In a case where second feedback information corresponding to at least one second DCI is transmitted in the first transmission resource, optionally, the receiving unit 310 may be further configured to receive a third signaling after a first target time, wherein the third signaling indicates the terminal device to transmit feedback of the target group by using a second transmission resource, and a new feedback indicator field corresponding to the target group takes a first value. The transmission unit 330 is further configured to arrange the first feedback information and the third feedback information corresponding to the target group into a second feedback information codebook. Optionally, the third feedback information includes the second feedback information. That is, the first feedback information transmitted in the same first resource as the second feedback information is processed in the same way.

Optionally, the receiving unit 310 is further configured for the terminal device to receive a fourth signaling after a second target time, wherein the fourth signaling indicates the terminal device to transmit information of the target group, and a new feedback indicator field corresponding to the target group takes a second value. The transmission unit 330 is further configured for the terminal device to clear the first feedback information. That is, the first feedback information transmitted in the same first resource as the second feedback information is processed in the same way.

Optionally, NFI information and/or T-DAI information corresponding to a triggered feedback group may be indicated in the third signaling or the fourth signaling simultaneously.

Optionally, the transmission unit 330 is specifically configured to arrange and generate the feedback information codebook according to the following manner.

Arrangement order 1: the first feedback information corresponding to the first DCI is at front, and the first feedback information is arranged in an order of the downlink channel index DAI indicated in the at least one first signaling. The second feedback information corresponding to the second DCI or third feedback information is at back, is arranged in an order of group information of the target group, and is also arranged in an order of the DAI within each group.

Arrangement order 2: the first feedback information corresponding to the first DCI is at the end, and the first feedback information is arranged in an order of the downlink channel index indicated in the at least one first signaling. The second feedback information or the third feedback information is arranged at front and arranged in an order of group information of the target group in the second feedback information. The second feedback information or the third feedback information is arranged in an order of a downlink channel index indicated in the second signaling in each of the target groups.

In the second implementation of the present disclosure, when a terminal device which is configured to use a group-based feedback mode receives DCI information of DCI format one, and a transmission resource of the first feedback information corresponding to DCI format one is overlapped with a transmission resource of other second feedback information with grouping, the first feedback information corresponding to DCI format one is multiplexed and transmitted with other second feedback information with grouping. Therefore, other information (such as group information and NFI information) does not need to be introduced into DCI format one, which ensures that the terminal device and the network device can keep a consistent understanding of feedback information and avoids receiving errors caused by ambiguity. At the same time, it may ensure that the terminal device and network device maintain normal data transmission functions during processes such as initial connection, reconnection and RRC signaling reconfiguration. In addition, please refer to the same or corresponding parts in the above-mentioned first implementation for the matters not explained in the second implementation, and they will not be repeated here.

Third Implementation

Figure 10:
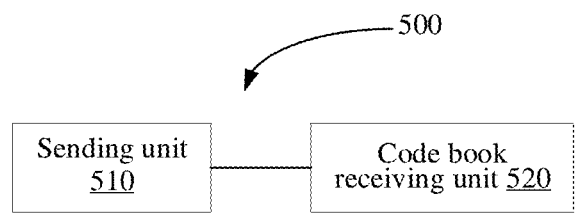
FIG. 10 is a block schematic diagram of a device for generating uplink information provided in the third implementation of the present disclosure.

Please refer to FIG. 10, it is a block schematic diagram of a device for generating uplink information 500 provided according to the third implementation of the present disclosure. The device 500 includes a sending unit 510 and a codebook receiving unit 520.

The sending unit 510 is configured to send at least one first signaling and at least one second signaling to a terminal device, wherein a physical channel scheduled by the first signaling or a physical channel carrying the first signaling has no group information.

The codebook receiving unit 520 is configured to receive a first feedback information codebook sent by the terminal device, wherein the first feedback information codebook is generated by the terminal device according to first feedback information and second feedback information, the first feedback information is feedback information corresponding to the first signaling, the second feedback information is feedback information corresponding to a target group indicated by the second signaling, and a transmission resource of the second feedback information is overlapped with a transmission resource of the first feedback information.

Optionally, the sending unit 510 is further configured for the network device to send a third signaling after a first target time, wherein the third signaling indicates the terminal device to transmit the feedback information of the target group by using a second transmission resource, and new feedback indication information corresponding to the target group takes a first value.

Then the codebook receiving unit 520 is further configured to receive the second information codebook, wherein the second information codebook includes the first feedback information and third feedback information corresponding to the target group, the third feedback information includes the second feedback information.

Optionally, the sending unit 510 is further configured to send a fourth signaling after a second target time, wherein the fourth signaling indicates the terminal device to transmit information of the target group, and new feedback indication information corresponding to the target group takes a second value, causing the terminal device to clear the first feedback information.

For the arrangement of the first feedback information codebook or the second feedback information codebook, and other parts that have not been elaborated or defined in detail, please refer to the same or corresponding parts in the first implementation above, which will not be repeated here.

Fourth Implementation

Figure 11:
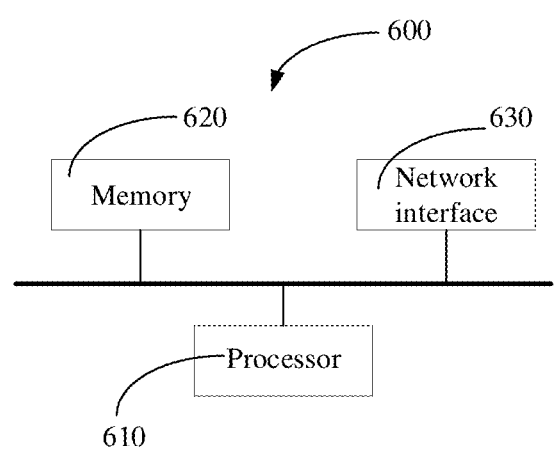
FIG. 11 is a structural diagram of a device for generating uplink information provided in the fourth implementation of the present disclosure.

Please refer to FIG. 11, it is a structure diagram of a device for generating uplink information 600 provided according to the fourth implementation of the present disclosure. The device 600 includes a processor 610, a memory 620, and a network interface 630. The processor 610 calls a program in the memory 620, executes the acts of the method for generating uplink information provided in the first implementation above, and sends the execution result through the network interface 630.

The processor 610 may be an independent component or a collective name of multiple processing elements. For example, the processor 610 may be a CPU, an ASIC, or one or more integrated circuits configured to implement the above method, such as at least one microprocessor DSP, or at least one programmable gate FPGA.

The present disclosure is described with reference to flowcharts and/or block diagrams of methods, devices (systems), and computer program products according to implementations of the present disclosure. It should be understood that each flow and/or block in the flowchart and/or block diagram, and a combination of flows and/or blocks in the flowchart and/or block diagram can be implemented by computer program instructions. These computer program instructions may be provided to a general purpose computer, a special purpose computer, an embedded processor or a processor of other programmable data processing device to produce a machine, such that the instructions which are executed by a computer or a processor of other programmable data processing device produce an apparatus for implementing functions specified in one or more flows in a flow chart and/or one or more blocks in a block diagram. The program may be stored in a computer-readable storage medium, which may include Read Only Memory (ROM), Random Access Memory (RAM), magnetic disk or optical disk, etc.

The above implementations illustrate but do not limit the present disclosure, and those skilled in the art can design multiple alternative examples within the scope of the claims. Those skilled in the art should recognize that appropriate adjustments, modifications, etc. can be made to specific implementations without departing from the scope of the disclosure as defined in the appended claims. Therefore, any modifications and changes made in accordance with the spirit and principles of the present disclosure are within the scope of the present disclosure as defined by the appended claims.

What we claim is:

1. A method for generating uplink feedback information transmission for data received in an Unlicensed Spectrum, comprising:
    receiving, by a terminal device, at least one first signaling having DCI format 1_0 from a network device, wherein the first signaling has no group information and said having no group information comprises that group information is not indicated in Downlink control information (DCI), and wherein the group information indicates which group corresponds to a Physical Downlink Shared Channel (PDSCH) scheduled by the DCI or corresponds to a Physical Downlink Control Channel (PDCCH) carrying the DCI;
    determining, by the terminal device, a first transmission resource for transmitting first feedback information corresponding to the first signaling; and
    generating, by the terminal device, a first feedback information codebook, wherein the first feedback information codebook comprises the first feedback information and second feedback information, the second feedback information is feedback information corresponding to a target PDSCH group or a target PDCCH group indicated by a second signaling received from the network device, and a transmission resource of the second feedback information is overlapping with the first transmission resource; and
    transmitting, by the terminal device, the first feedback information codebook to the network device in the first transmission resource,
    wherein the terminal device adopts a group based ACK/NACK feedback of PDSCH or PDCCH.

2. The method of claim 1, further comprising:
    indicating, by a third signaling, the terminal device to use a second transmission resource to transmit feedback information of the target group, if the terminal device receives the third signaling after a first target time, wherein a value of a new feedback indicator field corresponding to the target group is a first value; and
    generating, by the terminal device, a second feedback information codebook, wherein the second feedback information codebook comprises the first feedback information and third feedback information, and the third feedback information corresponds to the target group.

3. The method of claim 2, wherein the first target time is: a sending end time of the second signaling.

4. The method of claim 2, wherein,
    the first value is a target value, and the target value is a value of a new feedback indicator field corresponding to the target group when the terminal device determines to transmit second feedback information corresponding to the target group according to the second signaling; or, the first value is a predetermined value.

5. The method of claim 1, further comprising:
indicating, by a fourth signaling, the terminal device to transmit second feedback information corresponding to the target group, if the terminal device receives the fourth signaling after a second target time, wherein a value of a new feedback indicator field corresponding to the target group is a second value.

6. The method of claim 5, wherein the second value is different from a target value, and the target value is a value of a new feedback indicator field corresponding to the target group when the terminal device determines to transmit second feedback information corresponding to the target group according to the second signaling; or,
the second value is a predetermined value.

7. A device for generating uplink feedback information transmission for data received in an Unlicensed Spectrum, comprising: a processor and a memory comprising a computer program, where the memory and the computer program are configured with the processor to cause the device at least to:
receive at least one first signaling having DCI format 1_0 from a network device, wherein the first signaling has no group information and said having no group information comprises that group information is not indicated in Downlink control information (DCI), and wherein the group information indicates which group corresponds to a Physical Downlink Shared Channel (PDSCH) scheduled by the DCI or corresponds to a Physical Downlink Control Channel (PDCCH) carrying the DCI;
determine a first transmission resource for transmitting first feedback information corresponding to the first signaling; and
generate a first feedback information codebook, wherein the first feedback information codebook comprises the first feedback information and second feedback information, the second feedback information is feedback information corresponding to a target PDSCH group or a PDCCH group indicated by a second signaling received from the network device, and a transmission resource of the second feedback information is overlapping with the first transmission resource;
transmit the first feedback information codebook to the network device in the first transmission resource,
wherein the device adopts a group based ACK/NACK feedback of PDSCH or PDCCH.

8. The device of claim 7, wherein the device is further be caused to, indicate, by a third signaling, the device to use a second transmission resource to transmit feedback of the target group, if the third signaling is received after a first target time, wherein a value of a new feedback indicator field corresponding to the target group is a first value; and
arrange the first feedback information and third feedback information corresponding to the target group into a second feedback information codebook.

9. The device of claim 8, wherein the first target time is: a sending end time of the second signaling.

10. The device of claim 8, wherein the first value is a target value, and the target value is a value of a new feedback indicator field corresponding to the target group when the device determines to transmit second feedback information corresponding to the target group according to the second signaling; or, the first value is a predetermined value.

11. The device of claim 7, wherein the device is further be caused to, indicate, by a fourth signaling, the device to transmit feedback information corresponding to the target group, if the device receives a fourth signaling after a second target time, wherein a value of a new feedback indicator field corresponding to the target group is a second value.

12. The device of claim 11, wherein the second value is different from a target value, and the target value is a value of a new feedback indicator field corresponding to the target group when the device determines to transmit second feedback information corresponding to the target group according to the second signaling; or,
the second value is a predetermined value.

13. A device for generating uplink feedback information transmission for data received in an Unlicensed Spectrum, comprising: a processor and a memory comprising a computer program, where the memory and the computer program are configured with the processor to cause the device at least to:
send at least one first signaling having DCI format 1_0 and at least one second signaling to a terminal device, wherein the first signaling has no group information and said having no group information comprises that group information is not indicated in Downlink control information (DCI), and wherein the group information indicates which group corresponds to a Physical Downlink Shared Channel (PDSCH) scheduled by the DCI or corresponds to a Physical Downlink Control Channel (PDCCH) carrying the DCI; and
receive a first feedback information codebook sent by the terminal device; wherein the first feedback information codebook is generated by the terminal device according to first feedback information and second feedback information, wherein the first feedback information is feedback information corresponding to the first signaling, the second feedback information is feedback information corresponding to a target PDSCH group or a target PDCCH group indicated by the second signaling, and a transmission resource of the second feedback information is overlapping with a transmission resource of the first feedback information;
wherein the terminal device adopts a group based ACK/NACK feedback of PDSCH or PDCCH.

14. The device of claim 13, wherein the device is further be caused to:
send a third signaling after a first target time, wherein the third signaling indicates the terminal device to transmit feedback information of the target group by using a second transmission resource, and a value of a new feedback indicator field corresponding to the target group is a first value; and
receive a second information codebook, wherein the second information codebook comprises the first feedback information and third feedback information corresponding to the target group.

15. The device of claim 14, wherein the first target time is:
a sending end time of the second signaling.

16. The device of claim 14, wherein the first value is a target value, and the target value is a value of a new feedback indicator field corresponding to the target group when the terminal device determines to transmit second feedback information corresponding to the target group according to the second signaling; or,
the first value is a predetermined value.

17. The device of claim 13, wherein the device is further be caused to:
send a fourth signaling after a second target time, wherein the fourth signaling indicates the terminal device to transmit information of the target group, and a value of a new feedback indicator field corresponding to the target group is a second value.

18. The device of claim 17, wherein that the value of the new feedback indicator field corresponding to the target group is the second value comprises:
the second value is different from the target value, the target value is a value of a new feedback indicator field corresponding to the target group when the terminal device determines to transmit second feedback information corresponding to the target group according to the second signaling; or
the second value is a predetermined value.

* * * * *